W. S. DRAPER.
BRAKE LEVER.
APPLICATION FILED FEB. 14, 1913.

1,119,689.

Patented Dec. 1, 1914.

Inventor
William S. Draper
By Victor J. Evans
Attorney

Witnesses
M. F. Garrett
V. B. Hillyard.

UNITED STATES PATENT OFFICE.

WILLIAM S. DRAPER, OF TACOMA, WASHINGTON.

BRAKE-LEVER.

1,119,689.

Specification of Letters Patent.

Patented Dec. 1, 1914.

Application filed February 14, 1913. Serial No. 748,418.

*To all whom it may concern:*

Be it known that I, WILLIAM S. DRAPER, a citizen of the United States, residing at Tacoma, in the county of Pierce and State of Washington, have invented new and useful Improvements in Brake-Levers, of which the following is a specification.

The primary purpose of this invention is the provision of an adjustable lever to be used in brake and clutch mechanisms for vehicles and machinery generally, thereby overcoming the necessity for adjusting a number of parts to compensate for wear or when installing the connections.

The invention consists of an arm attached to the part to be operated, said arm having a cross-head, a slide mounted upon the cross-head, means for moving such slide and securing it in the adjusted position, said means preferably consisting of a screw and jam nut, and a lever adapted to be adjustably connected with the arm and engaging the said slide, the connection between such lever and arm being of a pivotal nature to admit of the lever moving with the slide when adjusting the latter to obtain the desired results.

The invention consists of the novel features, details of construction and combination of parts, which hereinafter will be more particularly set forth, illustrated in the accompanying drawing, and pointed out in the appended claims.

Figure 3:
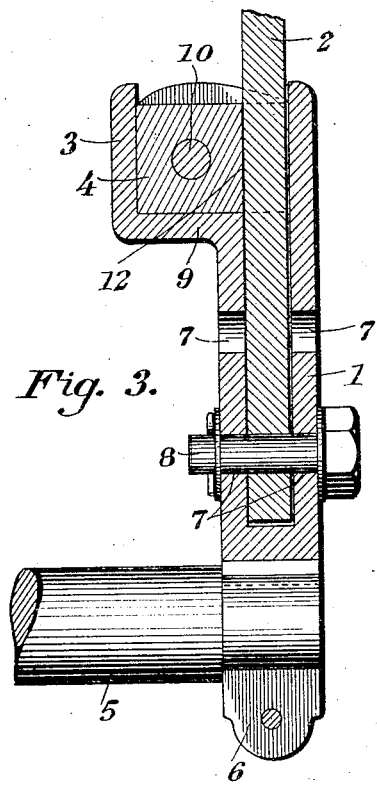
Figure 1:
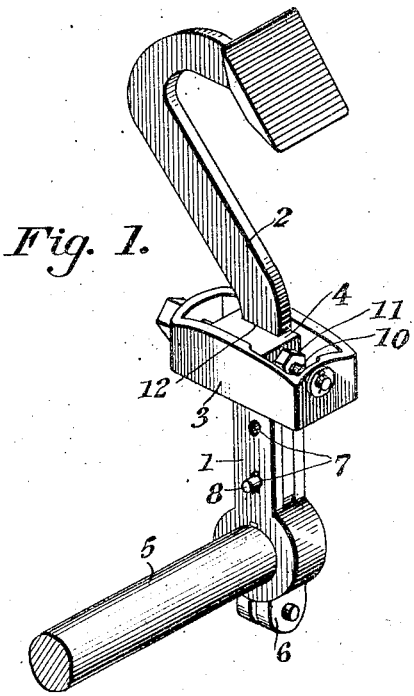
Figure 2:
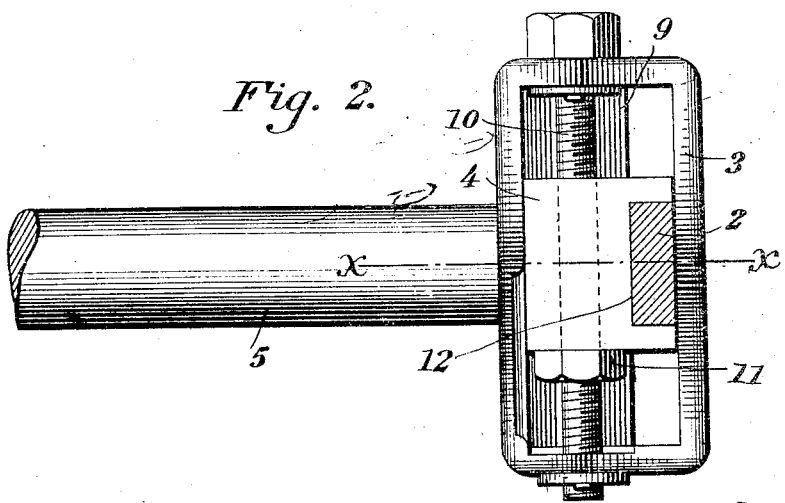

Referring to the drawing, forming a part of the specification, Figure 1 is a perspective view of a brake and clutch lever embodying the invention. Fig. 2 is a top plan view. Fig. 3 is a section on the line $x$—$x$ of Fig. 2.

Corresponding and like parts are referred to in the following description, and indicated in all the views of the drawing, by the same reference characters.

The term brake lever is used in a general sense to designate a lever for any purpose. The brake lever comprises an arm 1 and a lever 2, the latter having both pivotal and adjustable connection with the arm and adapted to be relatively moved to compensate for wear between the connections intermediate the brake lever and the part to be operated thereby. The arm 1 has a cross-head 3 at its outer or free end upon which is mounted a slide 4, the latter engaging the lever 2 so as to effect a relative movement thereof when it is required to adjust the parts. The arm 1 is adapted to be secured to a shaft 5 or other part by any means and for this purpose it is formed with a clamp 6. The arm comprises transversely spaced members between which the lever 2 is inserted, said members having openings 7 to receive a pin or like fastening 8 by means of which the lever 2 is pivotally connected with the arm. The crosshead 3 consists of an oblong frame, the longitudinal bars of which have connection at a middle point with the members comprising the arm 1. One of the longitudinal bars or members comprising the cross-head 3 has an inner flange 9 which engages the slide 4 so as to prevent turning thereof. A screw 10 is journaled at or near its ends in the end bars of the frame comprising the crosshead 3 and has a screwthread engagement with the slide 4 so as to move the latter lengthwise of the cross-head. A jam nut 11 mounted upon the screw 10 is adapted to engage the slide 4 and secure the latter in the adjusted position. The slide 4 consists of a block in a side of which is formed a recess 12 to receive the lever 2.

The lever 2 may be of any construction and adapted to be operated by hand or foot or may form a part of connecting means between the brake lever and the part to be operated, such as a brake or clutch. The lever 2 is adapted to be adjustably connected with the arm 1 to vary the length of the brake lever as a whole and pivotal movement of the lever on the pin or fastening 8 admits of relative angular adjustment between the parts 1 and 2 so as to take up for wear or admit of adjusting the parts to meet requirements. The screw 10 is positive and convenient means for adjusting the lever 2 and when the adjustment is effected the slide is made secure by means of the jam nut 11, which preferably binds against the slide. The lever 2 may be easily placed in position or removed from the arm when the pin or fastening 8 is withdrawn from the opening 7, said lever being movable endwise in the recess 12 and in the space formed between the members comprising the arm 1.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. A brake lever comprising an arm having a cross head at its outer end, a lever adjustable upon the arm longitudinally and angularly, a pivot fastening for securing the lever to the arm in the adjusted position, a slide mounted upon the cross head of the arm and engaging the lever and means mounted upon said cross head and adapted to engage the slide to move the same and lever and hold the latter in the adjusted angular position.

2. A brake lever comprising an arm embodying transversely spaced members, a cross-head at the outer end of the arm consisting of an oblong frame having its side members connected with the spaced members of the arm, one of said side members having an inner flange, a slide mounted between the side members of the cross-head and engaging the inner flange thereof, a lever engaging the slide and pivotally connected between the spaced members of the arm, and a screw mounted in the end members of the cross-head and engaging the said slide.

In testimony whereof I affix my signature in presence of two witnesses.

WILLIAM S. DRAPER.

Witnesses:
  GEORGE BURNETT,
  A. M. KEELER.